US012651468B2

(12) United States Patent
Herard et al.

(10) Patent No.: US 12,651,468 B2
(45) Date of Patent: Jun. 9, 2026

(54) METHOD FOR IDENTIFYING A LOGO IN AN IMAGE

(71) Applicant: FMR LLC, Boston, MA (US)

(72) Inventors: Vallex Herard, Upper Nyack, NY (US); Pradeep Mooda, Khajaguda (IN); Arindam Paul, Bangalore (IN); Sarath R. Nair, Alappuzha (IN); Santhosh Kolloju, Suryapet (IN); Jason Matthew Megaro, Northborough, MA (US); Last Feremenga, Little Elm, TX (US); Chalampalem Praveen Kumar, Tirupati (IN)

(73) Assignee: FMR LLC, Boston, MA (US)

( * ) Notice: Subject to any disclaimer, the term of this patent is extended or adjusted under 35 U.S.C. 154(b) by 268 days.

(21) Appl. No.: 18/381,383

(22) Filed: Oct. 18, 2023

(65) Prior Publication Data

US 2025/0131746 A1 Apr. 24, 2025

(51) Int. Cl.
| | |
|---|---|
| *G06V 20/60* | (2022.01) |
| *G06F 40/284* | (2020.01) |
| *G06V 10/774* | (2022.01) |
| *G06V 10/82* | (2022.01) |
| *G06V 10/86* | (2022.01) |

(52) U.S. Cl.
CPC ............ *G06V 20/60* (2022.01); *G06F 40/284* (2020.01); *G06V 10/774* (2022.01); *G06V 10/82* (2022.01); *G06V 10/86* (2022.01); *G06V 2201/09* (2022.01)

(58) Field of Classification Search
CPC ...... G06V 20/60; G06V 10/774; G06V 10/82; G06V 10/86; G06V 2201/09; G06F 40/284
See application file for complete search history.

(56) References Cited

FOREIGN PATENT DOCUMENTS

WO WO-2024155698 A1 * 7/2024 ........... G06N 3/0464

OTHER PUBLICATIONS

"Muhammad, Multimodality Representation Learning: A Survey on Evolution, Pretraining and Its Applications, Feb. 11, 2023, ACM Transactions on Multimedia Computing, Communications and Applications, vol. 20, Issue 3" (Year: 2023).*

(Continued)

*Primary Examiner* — Oneal R Mistry
*Assistant Examiner* — Justin Philip Cascais
(74) *Attorney, Agent, or Firm* — Cesari and McKenna, LLP; Omar M. Wadhwa

(57) ABSTRACT

A method for identifying the presence of a logo in an image includes providing a neural network having an image encoder, a text encoder, and a score calculator. The method includes receiving the image and a textual description associated with the logo. The method further includes providing the image to the image encoder and the textual description to the text encode. The method includes executing the image encoder and the text encoder, wherein the image encoder generates one or more image embeddings from the image and the text encoder generates one or more text embeddings from the textual description. The method further includes executing the score calculator, wherein the score calculator generates a score from the one or more image embeddings and the one or more text embeddings. The method also includes determining the presence of the logo in the image based on the score.

16 Claims, 5 Drawing Sheets

100

(56) References Cited

OTHER PUBLICATIONS

Caron, "Unsupervised Learning of Visual Features by Contrasting Cluster Assignments", Jan. 8, 2021, arXiv (Year: 2021).*

"Hubenthal, Image-Text Pre-Training for Logo Recognition, Sep. 18, 2023, Proceedings of the IEEE/CVF Winter Conference on Applications of Computer Vision (WACV), 2023, pp. 1145-1154" (Year: 2023).*

* cited by examiner

100

METHOD FOR IDENTIFYING A LOGO IN AN IMAGE

BACKGROUND

Technical Field

The present invention relates to image processing by machine learning, and more particularly to identifying the presence of a logo in an image using a neural network.

Background

Identifying a logo of interest in an image or video is a challenging task because a logo can be present anywhere in the image or video and can be of any shape or size. Identification of a logo in an image or video is therefore often performed as a time-consuming manual task.

Deep learning neural networks, also called machine learning models, such as Contrastive Language-Image Pre-Training (CLIP) have been designed to efficiently learn visual concepts from natural language supervision. CLIP is publicly available and described in detail in arxiv.org/abs/2103.00020 and openai.com/research/clip, both of which are incorporated herein by reference in their entireties. CLIP is pre-trained on a wide variety of images, such as the YFCC100M dataset, and can be instructed in natural language to perform classification tasks in a zero-shot manner.

CLIP is not optimized for logo recognition. When given about 10-15 images of the logo of each one of 10 brands, CLIP was only able to accurately identify about 70% of the logos. However, CLIP can be further trained or fine-tuned. For example, fine-tuning CLIP using about 10-15 images of the logo of each one of the 10 brands leads to a much better accuracy for the test dataset. After fine-tuning, CLIP is able to correctly identify 303 images out of 329, i.e. achieves an accuracy of 92.1%.

However, the improved accuracy of the fine-tuned CLIP model is limited to the logos used for training. Any addition of new brand logos requires re-training the model. When testing the fine-tuned model that was able to accurately identify 92.1% of logos with a dataset that contained 176 images from the 10 known brands and 153 images with logos unknown to the model, the model was only able to identify 261 images out of 329 correctly, i.e. the model merely achieved an accuracy of 79.3%. This shows that to reliably identify new brand logos in an image or video, a different approach is needed.

SUMMARY

The deficiencies of the prior art are overcome by providing a method to identify the presence of a logo in an image or video even if the model has not been previously trained to identify that specific logo. In accordance with one embodiment of the present invention, a computer-implemented method for identifying a presence of a logo in an image includes providing a neural network residing on a computing device, wherein the neural network has an image encoder, a text encoder, and a score calculator. The method includes receiving, by the computing device, the image and a textual description associated with the logo. The method further includes providing, by the computing device, the image to the image encoder and the textual description to the text encode. The method includes executing, by the computing device, the image encoder and the text encoder, wherein the image encoder generates one or more image embeddings from the image and the text encoder generates one or more text embeddings from the textual description. The method further includes executing, by the computing device, the score calculator, wherein the score calculator generates a score from the one or more image embeddings and the one or more text embeddings. The method also includes determining, by the computing device, the presence of the logo in the image based on the score.

Alternatively, or in addition, the logo is a brand logo, and the textual description includes the name of the brand. The method may further include pre-processing the image. The method may be executed for each one of a plurality of images, wherein the textual description is identical for each one of the plurality of images.

Alternatively, or in addition, the image encoder has at least 6 layers and the text encoder has at least 6 layers. The penultimate 4 layers of the image encoder and the penultimate 4 layers of the text encoder may have been additionally trained using training data. The training data may include a series of training images of a training logo associated with a textual description of the training logo, wherein each one of the series of training images is a cropped version of a preceding one of the series of training images. The penultimate 4 layers of the image encoder and the penultimate 4 layers of the text encoder may also have been fine-tuned using fine-tuning data, wherein the fine-tuning data includes a series of fine-tuning images of a fine-tuning logo associated with a textual description of the fine-tuning logo, and wherein each one of the series of fine-tuning images is a cropped version of a preceding one of the series of fine-tuning images.

Alternatively, or in addition, the score is associated with the presence of the logo in the image. The method may further include tokenizing the textual description.

In accordance with another embodiment of the present invention, a system for identifying a presence of a logo in an image includes a computing device, having a processor coupled to a memory, and a neural network residing on the computing device and configured to be executed by the processor, the neural network including an image encoder, a text encoder, and a score calculator, The processor is configured to receive the image and a textual description associated with the logo. The processor is also configured to provide the image to the image encoder and the textual description to the text encoder. The processor is further configured to execute the image encoder and the text encoder, wherein the image encoder is configured to generate one or more image embeddings from the image and the text encoder is configured to generate one or more text embeddings from the textual description. The processor is also configured to execute the score calculator, wherein the score calculator is configured to generate a score from the one or more image embeddings and the one or more text embeddings. The processor is configured to determine the presence of the logo in the image based on the score.

Alternatively, or in addition, the logo is a brand logo, and the textual description includes the name of the brand. The processor may further be configured to pre-process the image.

Alternatively, or in addition, the image encoder has at least 6 layers and the text encoder has at least 6 layers. The penultimate 4 layers of the image encoder and the penultimate 4 layers of the text encoder may have been additionally trained using training data. The training data may include a series of images of a training logo associated with a textual description of the training logo, wherein each one of the series of images is a cropped version of a preceding one of the series of images. The penultimate 4 layers of in the image encoder and the penultimate 4 layers of the text encoder may also have been fine-tuned using fine-tuning data, wherein the fine-tuning data includes a series of fine-tuning images of a fine-tuning logo associated with a textual description of the fine-tuning logo, and wherein each one of the series of fine-tuning images is a cropped version of a preceding one of the series of fine-tuning images.

Alternatively, or in addition, the processor is further configured to tokenize the textual description.

In accordance with yet another embodiment of the present invention, a non-transitory computer-readable medium has software encoded thereon. The software, when executed by one or more computing devices, is operable to provide a neural network residing on a computing device, wherein the neural network has an image encoder, a text encoder, and a score calculator. The software is operable to receive, by the computing device, the image and a textual description associated with the logo. The software is also operable to provide, by the computing device, the image to the image encoder and the textual description to the text encoder. The software is further operable to execute, by the computing device, the image encoder and the text encoder, wherein the image encoder generates one or more image embeddings from the image and the text encoder generates one or more text embeddings from the textual description. The software is operable to execute, by the computing device, the score calculator, wherein the score calculator generates a score from the one or more image embeddings and the one or more text embeddings. The software is also operable to determine, by the computing device, the presence of the logo in the image based on the score.

Alternatively, or in addition, the logo is a brand logo, and the textual description includes the name of the brand.

BRIEF DESCRIPTION OF THE DRAWINGS

The description below refers to the accompanying drawings, of which.

DETAILED DESCRIPTION OF ILLUSTRATIVE EMBODIMENTS

Figure 1:
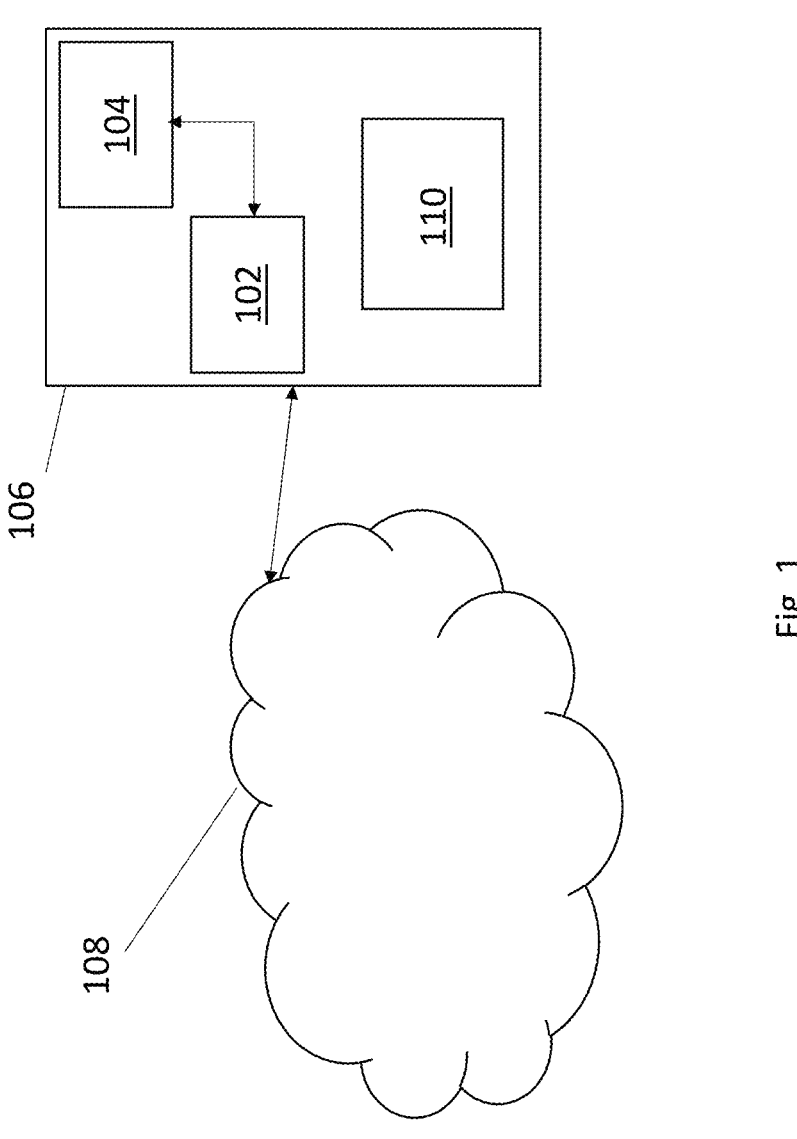
FIG. 1 is an illustration of a system for identifying a presence of a logo in an image in accordance with an embodiment of the present invention.

FIG. 1 is an illustration of a system 100 for identifying the presence of a logo in an image in accordance with an embodiment of the present invention. A computing device 106 includes a processor 102 coupled to memory 104. The computing device 106 may be coupled to a network 108, or it may not be connected to a network. The network 108 may be the internet, or it may be any other public or private network. Also residing in the computing device 108 is a machine learning model 110. The machine learning model 110 may be stored in the memory 104 and may be executed by the processor 102, or it may be a separate entity within the computing device 106. It is also expressly noted that the machine learning model 110 may not reside in the computing device 106 but may reside in a different entity that is also coupled to the network 108. In that case, the computing device 106 communicates with the machine learning model 110 via the network 108. The processor 104 of the computing device 106 is configured to execute the method described in detail below with reference to FIG. 4. The processor 104 of the computing device 106 may also be configured to execute processes for the machine learning model 110.

Illustratively, the machine learning model 110 may be a convolutional neural network such as one using the CLIP architecture described above. The neural network 110 may accept text-image pairs as an input. To this end, the neural network includes an image encoder, a text encoder, and a score calculator. While the use of images is described throughout this specification, it is expressly contemplated that the neural network 110 may also be used for videos. For example, a video may be used as an input to neural network 110 by converting it to a series of consecutive image frames as known to the skilled person.

The neural network 110 may be pre-trained from text-image pairs that are publicly available on the internet. The training and classification phases for CLIP are described in detail in the publications referenced above and briefly summarized herein.

Figure 2:
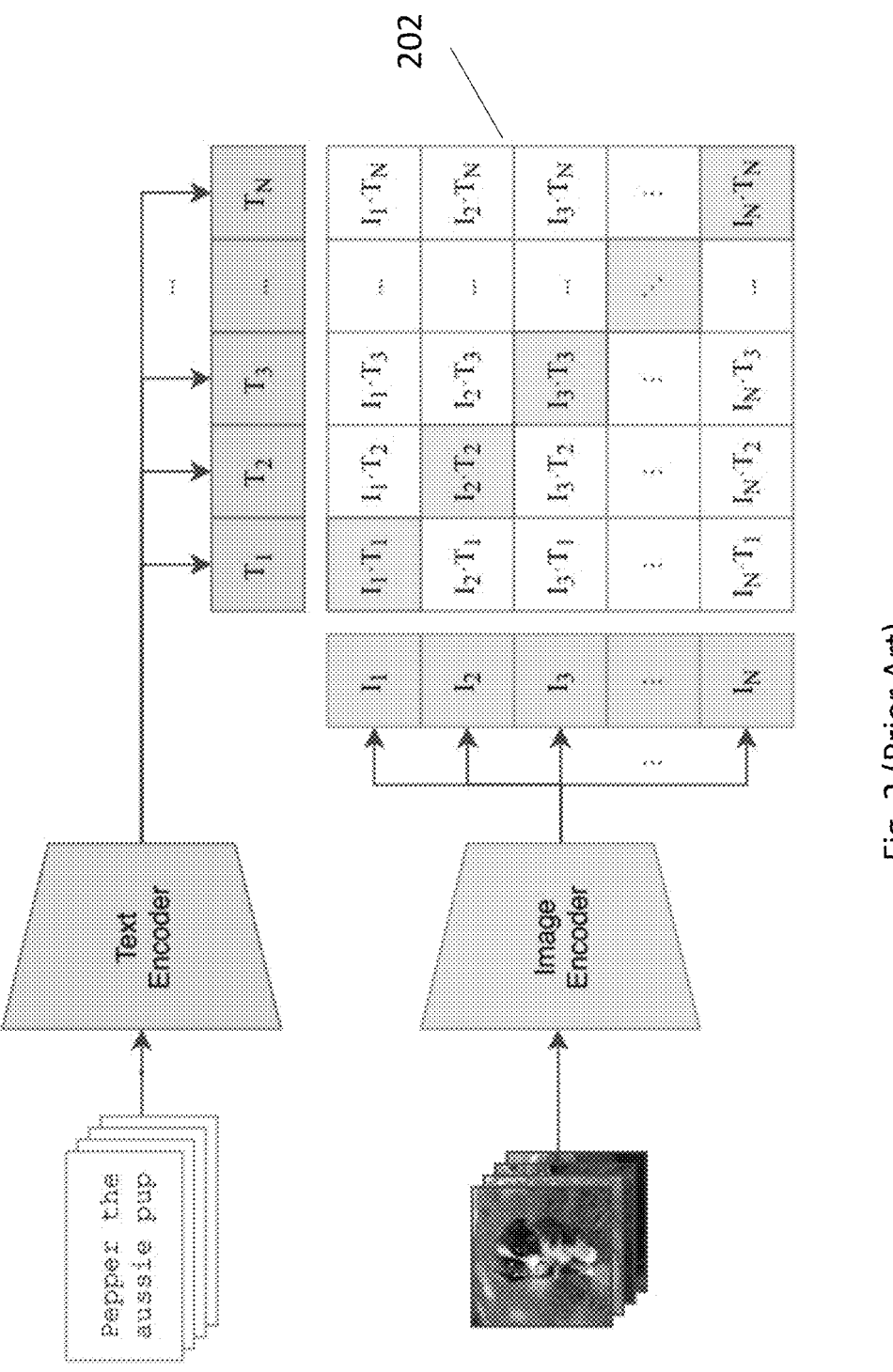
FIG. 2 is an illustration of a training phase for a CLIP neural network.

FIG. 2 illustrates the training phase. The starting point is a set of N images paired with their respective descriptions: <image1, text1>, <image2, text2>, <imageN, textN>. The CLIP model employs contrastive training, which aims to jointly train the image encoder and the text encoder. The image encoder produces image embeddings [I1, I2, . . . , IN}, and the text encoder produces text embeddings [T1, T2, . . . , TN]. The embeddings are produced so that the cosine similarities of the correct image-text pairs <I1, T1>, <I2, T2>, . . . are maximized. The embeddings are also produced so that the cosine similarities of incorrect image-text embeddings <I1, T2>, <I1, T3>, <I2, T1>, <I2, T3>, . . . are minimized.

In the flowchart shown in FIG. 2, the model receives a set of N image-text pairs. The text encoder may be a standard Transformer model with GPT2-style modifications, such as a masked self-attention Transformer. Transformer models are described in detail in arxiv.org/abs/1706.03762, which is incorporated herein by reference in its entirety. The image encoder may be a Vision Transformer such as a ViT-L/14 Transformer, described in detail in arxiv.org/abs/2010.11929, which is incorporated herein by reference in its entirety. For each image in the set, the image encoder computes an image embedding, i.e. a vector representing the image. The first image in the set corresponds to the I1 vector, the second image to the I2 sector, and so forth. The output of the image encoder is an N×D matrix, wherein D is the size of the latent dimension of the image and text embeddings. In a similar fashion, the text encoder computes text embeddings for the textual components of the set of text-image pairs. The first textual component of the set corresponds to the T1 vector, the second textual component to the T2 vector, and so forth. The output of the text encoder is another N×D matrix.

After the encoding, the two matrices containing the image embeddings and the text embeddings are multiplied, and the score calculator calculates the pairwise cosine similarities between each image and each textual component. This produces the N×N matrix 202 shown in FIG. 2. The loss function of the CLIP model is designed to maximize the pairwise cosine similarities along the diagonal of matrix 202. These are the correct image-text pairs. In a contrastive fashion, the loss function also aims to minimize the pairwise cosine similarities between off-diagonal elements. The CLIP model uses symmetric cross-entropy loss as its optimization objective. This minimizes off-diagonal cosine similarities in both the text-image direction (such as <T1,I2> in matrix 202) and the image-text direction (such as <I2, T1> in matrix 202). During the training phase, the weights of the CLIP model are adjusted to maximize cosine similarities along the diagonal of the matrix 202 and to minimize cosine similarities between off-diagonal elements.

Figure 3:
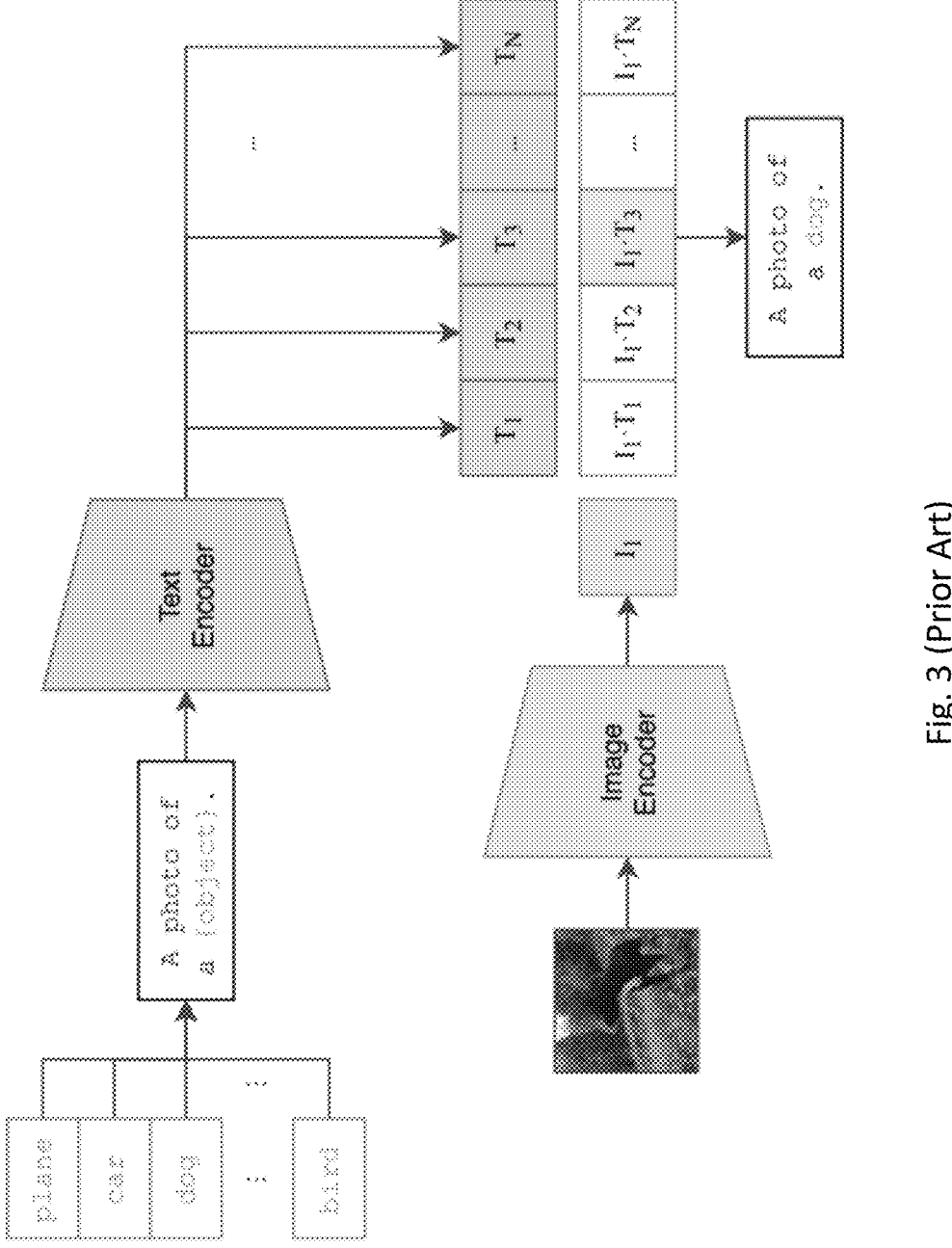
FIG. 3 is an illustration of a classification phase for a CLIP neural network.

After the training phase, the CLIP model may be used for zero-shot classification tasks. FIG. 3 illustrates the zero-shot classification phase of the neural network. The model 110 is given a set of textual descriptions and an image. Examples for textual descriptions may be "a photo of a plane", "a photo of a car", "a photo of a dog", etc. Each description in the set of textual descriptions is transformed by the text encoder into a corresponding text embedding T1, T2, . . . , TN. The image, which may exemplarily be a photo of a dog, is transformed by the image encoder into an image embedding. After the embeddings have been calculated, the score calculator of the CLIP model calculates the pairwise cosine similarities between the image embedding and each one of the text embeddings. The textual description that corresponds to the embedding with the highest similarity is chosen as the model output, i.e. the prediction. Together with the prediction the model outputs the score as a measure of the probability of the prediction. If the model is given more than one image as an input, the CLIP model may cache the text embeddings so that they do not need to be recomputed for each image.

Figure 4:
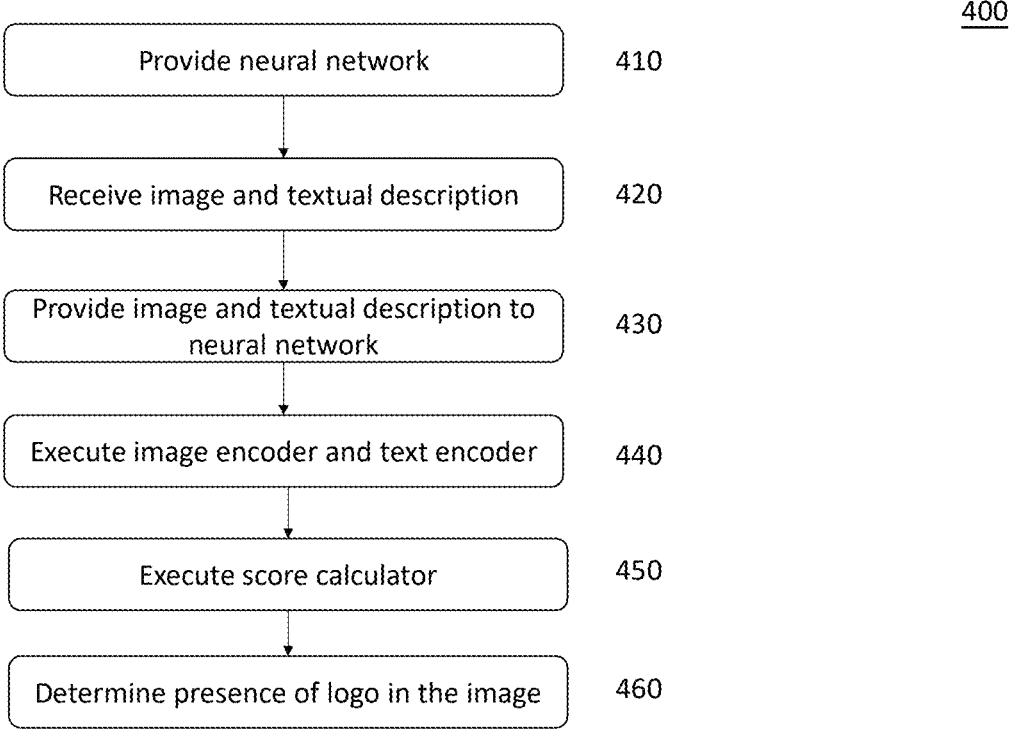
FIG. 4 is a flowchart of a method for identifying a presence of a logo in an image in accordance with an embodiment of the present invention.

FIG. 4 is a flowchart of a method 400 for identifying the presence of a logo in an image in accordance with an embodiment of the present invention. The computer-implemented method 400 may, for example, be executed by a processor of a computing device as shown above in FIG. 1.

In step 410, the method provides a neural network residing on a computing device. The computing device may be computing device 106, The neural network may be the machine learning model 110 described above and may exemplarily be a CLIP model. The neural network 110 has an image encoder, a text encoder, and a score calculator. The hyperparameters of the neural network 110 may be optimized for the task of identifying the presence of a logo in an image. Illustratively, the image encoder may have a hidden size of 1024. In other words, the dimensionality of the image encoder layers is 1024. The size of the intermediate layer in the image Transformer encoder may be 4096. The image Transformer may have 24 layers and 16 attention heads per layer. The image input size may be 224×224 pixels, and the patch size may be 14. The dimension of the image Transformer projection layer may be 768. The text encoder may have a hidden size of 768. The size of the intermediate layer of the text Transformer encoder may be 3072. The text Transformer may have 12 layers and 12 attention heads per layer. The maximum prompt length may be 77. The dimension of the text Transformer projection layer may be 768. Other hyperparameters may be chosen depending on the requirements of the logo identification task. For example, the model's learning rate may be 1e−6 and its weight decay 5e−4. The model may use 8 accumulation gradient steps and have a batch size of 4. While an exemplary and advantageous set of hyperparameters for the neural network 110 is described herein, it is expressly contemplated that any suitable set of hyperparameters may be used for the network as known to the skilled person.

In step 420, the computing device 106 receives the image and a textual description associated with the logo. The logo to be identified in the image may, for example, be a brand logo. In that case, the textual description includes the name of the brand. For example, if the model 110 is used to identify a logo of the ACME brand, the textual description may include the words "logo of ACME". As already stated above, the image may also be a frame extracted from a video. In that case, a plurality of images, corresponding to a series of frames extracted from the video, are received by the computing device and provided to the model 110. In the case of a video, the textual description for each one of the plurality of images is identical.

Instead of a textual description that includes a full prompt, a user of the method may also simply provide a name of a brand that the user is interested in identifying to the computing device 106. This name of the brand may be selected from a pre-defined list of brands, or it may be specific brand that the user would like to identify in the image or video. The computing device 106 then combines the brand name with a specific prompt designed for brand identification. Illustratively, the computing device 106 may prepend the words "a logo of" or "a logo of the brand" to the brand name received from the user. The computing device 106 may also tokenize the textual description. Tokens are common sequences of characters found in text which are then represented by integer values. While one token may correspond to a word, it may also correspond to less or more than a word. For example, in the textual description "a logo of ACME", the four words may be converted to four known tokens. The word "a" may correspond to a token represented by the value 1, the word "logo" may correspond to a token represented by the value 2, the word "of" may correspond to a token represented by the value 3, and the word "ACME" may correspond to a token represented by the value 4. Tokenizing the textual description reduces the dimensionality of the input. Instead of the 11 characters, i.e. 11 values, of the prompt "a logo of ACME", the tokenized input to the text encoder only includes 4 integer values.

In step 430, the computing device 106 provides the image to the image encoder and the textual description to the text encoder of the neural network 110 that resides on the computing device. Before providing the image to the neural network, the computing device 106 may pre-process the image in any way known to the skilled person. For example, the computing device may enhance edges in the image, may convert the image from a color-image to a grayscale image, the computing device may reduce or increase the resolution of the image, the computing device may alter the gamma function of the image, and so forth. Illustratively, the computing device 106 may pre-process the image using the Python Imaging Library which is publicly available at pypi.org/project/Pillow/.

In step 440, the computing device 106 executes the image encoder and the text encoder of the neural network 110. As described in detail above, the image encoder then produces image embeddings from the image, and the text encoder produces text embeddings from the textual description. Using the example hyperparameters above, the image embeddings may be calculated with a forward pass through 2 layers of convolution, 24 layers of Transformer blocks, and an image projection layer. The text embeddings may be calculated with 12 layers of Transformer blocks and a text projection layer.

In step 450, the computing device 106 executes the score calculator of the neural network 110. As described above, the score calculator may compute the pairwise cosine similarities between the image embeddings and the text embeddings. If the textual description given to the model 110 was a prompt asking for a logo, the score is associated with the presence of the logo in the image. The score may, for example, be a number between 0 and 1 and may represent the probability that the given logo is present in the image. The higher the score, the more probable it is that the logo is present in the image.

In step 460, the computing device 106 determines the presence of the logo in the image based on the score calculated in step 450. The method may include a threshold to determine the presence of the logo. For example, the computing device may be configured to determine that the logo is present if the score is equal to or higher than 0.85. If the score is lower than 0.85, the computing device may determine that the logo is not present in the image.

In an illustrative example, the neural network 110 is a large CLIP network as described above and has been additionally trained using additional training data such as the QMUL-OpenLogo dataset, publicly available at hangsu0730.github.io/qmul-openlogo/. The QMUL-Open-Logo dataset contains 27,083 images from 352 logo classes, i.e. 352 brands. From this dataset, about 21,000 images associated with 253 brands have been used for additional training. 5031 images associated with 82 brands, different from the training brands, have been used for validation. The training images have been provided to the model in three different forms, as shown in FIG. 5.

Figure 5:
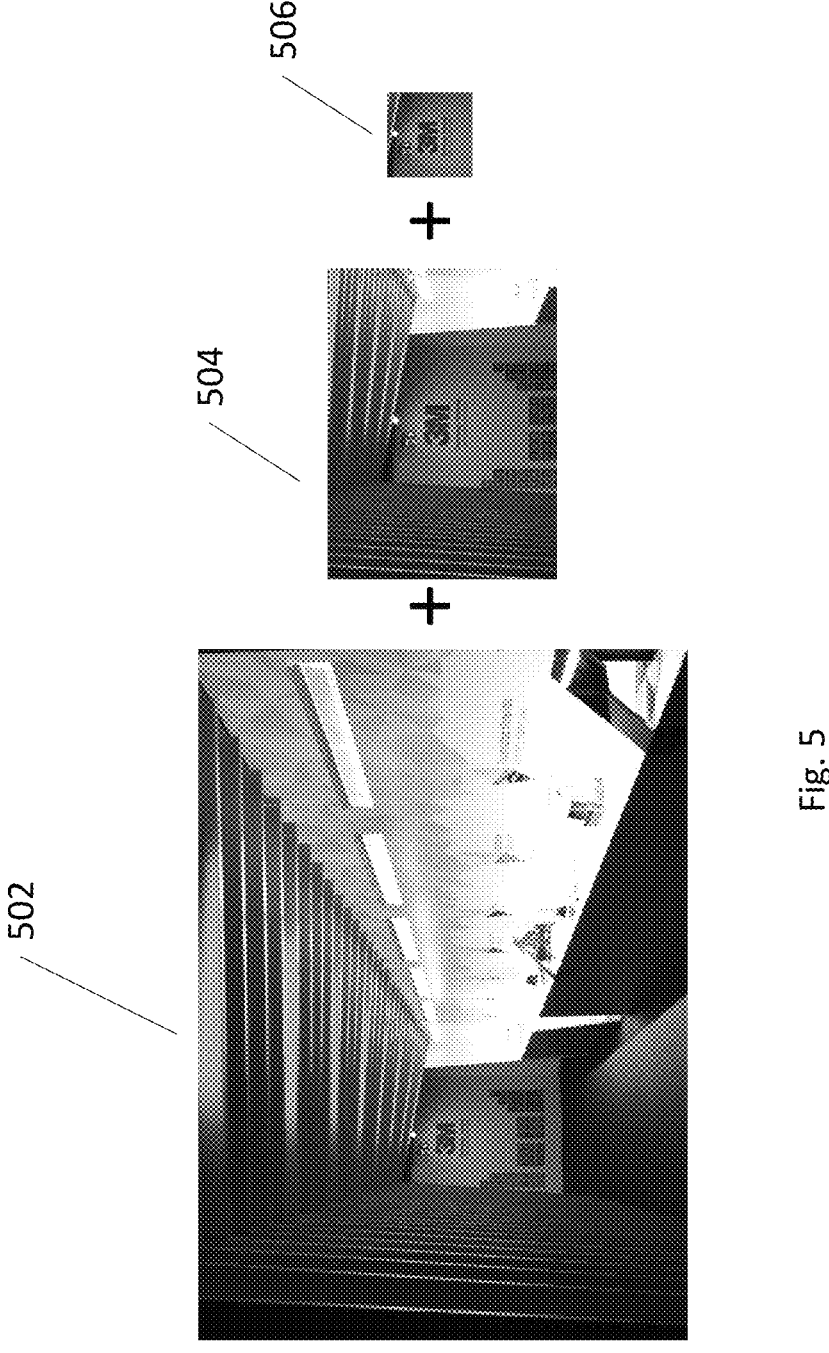
FIG. 5 is an illustration of training data provided to a neural network in accordance with an embodiment of the present invention.

FIG. 5 is an illustration of training data provided to the neural network in accordance with an embodiment of the present invention. Image 502 is the original image from the QMUL-OpenLogo dataset that contains a brand logo. The training data further includes the position of the brand logo in the original image. The position may be defined by a bounding box, such as the pixel coordinate of the top left corner of the logo and the pixel coordinate of the bottom right corner of the logo. The position may also be defined in any other suitable way, such as by providing the pixel coordinate of the top left corner of the logo and the size of the logo in pixels. The position of the logo and its bounding box or size also provides the size or area of the logo. A first cropped image 504 is generated from original image 502. The center of the first cropped image 504 is the logo portion of the original image 502, and the first cropped image 504 includes additional portions of the original image 502 that are located around the logo portion. The size of the first cropped image may be determined in any suitable way. For example, the size of the first cropped image 504 may be determined by the size of the logo. Illustratively, the size of the first cropped image 504 may be calculated by adding a margin around the area of the logo. The first cropped image 504 may then be generated by extracting that portion from the original image 502. In an example, the first cropped image 504 may include a 50-pixel margin around the area of the logo. The first cropped image 504 may then be generated from the original image 502 by extracting a portion that has its upper left corner at 50 pixels to the left of and 50 pixels above the upper left corner of the logo and has its lower right corner at 50 pixels to the right of and 50 pixels below the lower right corner of the logo. A second cropped image 506 is generated from either original image 502 or first cropped image 504. The second cropped image 506 contains not much more than the logo portion itself. The size of the second cropped image 506 may also be determined by the size of the logo. The second cropped image 506 may be generated by adding a margin around the area of the logo and extracting that portion from the original image 502 or the first cropped image 504. In an example, the second cropped image 506 may include a ten-pixel margin around the logo. The second cropped image 506 may then be generated from the original image 502 by extracting a portion that has its upper left corner at ten pixels to the left of and ten pixels above the upper left corner of the logo and has its lower right corner at ten pixels to the right of and ten pixels below the lower right corner of the logo. In another example, the size of the first and second cropped images 504 and 506 is determined by using relative values. The area of the logo may cover x % of the area of the original image 502. A second percentage, y %, is determined based on the size of the logo. For example, a logo that covers 10% of the original image 502 may result in y being 5%. The size of the second cropped image 506 may then be (x+y) % of the original image 502, i.e. 15%. The size of the first cropped image 504 may be (x+2y) % of the original image 502, i.e. 20%. The bounding boxes of the first and second cropped images 504 and 506 in the original image 502 are then calculated based on these percentages, and the first and second cropped images 504 and 506 are extracted from the original image 502. The first cropped image 504 can be considered a zoomed-in version of original image 502, and the second cropped image 506 can be considered a zoomed-in version of the first cropped image 504. In other words, the training data is expanded to not only include image-text pairs for images that contain brand logos somewhere in the image, such as images 502 and 504, but also for images of the brand logos, such as image 506.

All three images 502, 504, and 506 are provided to the model 110 as training data. To not lose the generalization capabilities of the model 110, only the penultimate 4 layers of both the image encoder and the text encoder may be additionally trained. In the exemplary model that has 24 layers (consecutively numbered 1-24) in the image encoder and 12 layers (consecutively numbered 1-12) in the text encoder, the additional training therefore only affects the weights of layers 20, 21, 22, and 23 of the image encoder and the weights of layers 8, 9, 10, and 11 of the text encoder. Limiting training to the 4 penultimate layers of the image encoder and the text encoder ensures that the model learns the concept of identifying brand logos while keeping the generalizability of the CLIP architecture.

Task-tuning the model by providing the additional training data in this form, i.e. including the original image and two zoomed-in versions, advantageously improves the performance of the model in a zero-shot classification task using the validation dataset. Without the additional training data, the model 110 correctly identified the logos in 4263 images of the validation data set and incorrectly identified the logos in 768 images, resulting in an accuracy of 84.73%. After the additional training, the model correctly identified the logos in 4555 images of the validation data set and incorrectly identified the logos in 476 images, resulting in an accuracy of 90.53%.

After the additional training, the model 110 may also be additionally fine-tuned using a small fine-tuning dataset to further improve the identification accuracy. The fine-tuning dataset is generated from the validation dataset of the additional training data and includes 10 images for each brand in the validation dataset. As shown in FIG. 5, two cropped versions of each one of the 10 images are also being generated. The model 110, additionally trained using the about 21.000 training images and their zoomed-in versions as described above, is now being fine-tuned using the fine-tuning dataset, including the 10 images for each brand and the two zoomed-in versions for each one of the 10 images. To validate the fine-tuned model, a subset of the validation dataset has been selected, because there was not enough data for fine-tuning for 19 brands in the validation dataset. Of the 4233 images in the subset of the validation dataset, the fine-tuned model correctly identified brand logos in 4001 images and incorrectly identified brand logos in 232 images, resulting in an accuracy of 94.52%.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for identifying a presence of a logo in an image, the method comprising:

providing a neural network residing on a computing device, wherein the neural network has an image encoder, a text encoder, and a score calculator;

training the neural network using training data comprising, for each of a plurality of training logos, (i) a first training image containing a particular training logo within a scene, and (ii) a plurality of second training images that are cropped versions of the first training image and depict the particular training logo at different scales;

receiving, by the computing device, the image and a textual description associated with the logo, wherein the logo of the image that is received is not used in the training of the neural network;

providing, by the computing device, the image to the image encoder and the textual description to the text encoder;

executing, by the computing device, the image encoder and the text encoder, wherein the image encoder generates one or more image embeddings from the image and the text encoder generates one or more text embeddings from the textual description;

executing the score calculator by the computing device, wherein the score calculator generates a score from the one or more image embeddings and the one or more text embeddings;

determining, by the computing device, that the logo, which is not used in the training of the neural network, is present in the image including one or more different objects when the score is equal to or higher than a threshold value; and determining, by the computing device, that the logo, which is not used in the training of the neural network, is not present in the image including one or more different objects when the score is less than the threshold value.

2. The computer-implemented method of claim 1, wherein the logo is a brand logo and wherein the textual description includes a name of the brand.

3. The computer-implemented method of claim 1, wherein the method further comprises pre-processing the image.

4. The computer-implemented method of claim 1, wherein the computer-implemented method is executed for each one of a plurality of images and wherein the textual description is identical for each one of the plurality of images.

5. The computer-implemented method of claim 1, wherein the image encoder has at least 6 layers and the text encoder has at least 6 layers.

6. The computer-implemented method of claim 5, wherein penultimate 4 layers of the image encoder and penultimate 4 layers of the text encoder have been trained using the training data.

7. The computer-implemented method of claim 1, wherein the score is associated with a presence of the logo in the image.

8. The computer-implemented method of claim 1, further comprising tokenizing the textual description.

9. A system for identifying a presence of a logo in an image, the system comprising:

a computing device having a processor coupled to a memory; and a neural network residing on the computing device and configured to be executed by the processor, the neural network including an image encoder, a text encoder, and a score calculator, the neural network further configured to be trained using training data comprising, for each of a plurality of training logos, (i) a first training image containing a particular training logo within a scene, and (2) a plurality of second training images that are cropped versions of the first training image and depict the particular training logo at different scales, wherein the processor is configured to:

receive the image and a textual description associated with the logo, wherein the logo of the image that is received is not used in the training of the neural network;

provide the image to the image encoder and the textual description to the text encoder;

execute the image encoder and the text encoder, wherein the image encoder is configured to generate one or more image embeddings from the image and the text encoder is configured to generate one or more text embeddings from the textual description;

execute the score calculator, wherein the score calculator is configured to generate a score from the one or more image embeddings and the one or more text embeddings;

determine that the logo is present in the image when the score is equal to or higher than a threshold value; and determine that the logo is not present in the image when the score is less than the threshold value.

10. The system of claim 9, wherein the logo is a brand logo and wherein the textual description includes a name of the brand.

11. The system of claim 9, wherein the processor is further configured to pre-process the image.

12. The system of claim 9, wherein the image encoder has at least 6 layers and the text encoder has at least 6 layers.

13. The system of claim 12, wherein penultimate 4 layers of the image encoder and penultimate 4 layers of the text encoder have been trained using the training data.

14. The system of claim 9, wherein the processor is further configured to tokenize the textual description.

15. A non-transitory computer-readable medium having software encoded thereon, the software, when executed by one or more computing devices operable to:

provide a neural network residing on a computing device, wherein the neural network has an image encoder, a text encoder, and a score calculator;

train the neural network using training data comprising, for each of a plurality of training logos, (i) a first training image containing a particular training logo within a scene, and (2) a plurality of second training images that are cropped versions of the first training image and depict the particular training logo at different scales;

receive the image and a textual description associated with the logo, wherein the logo of the image that is received is not used in the training of the neural network;

provide the image to the image encoder and the textual description to the text encoder;

execute the image encoder and the text encoder, wherein the image encoder generates one or more image embeddings from the image and the text encoder generates one or more text embeddings from the textual description;

execute the score calculator, wherein the score calculator generates a score from the one or more image embeddings and the one or more text embeddings; and determine that the logo is present in the image when the score is equal to or higher than a threshold value;

determine that the logo is not present in the image when the score is less than the threshold value.

16. The non-transitory computer-readable medium of claim 15, wherein the logo is a brand logo and wherein the textual description includes the name of the brand.

* * * * *